Oct. 4, 1932.   A. GOLDSCHLAGER ET AL   1,881,054
BREAD MOLDING DEVICE
Filed April 1, 1932
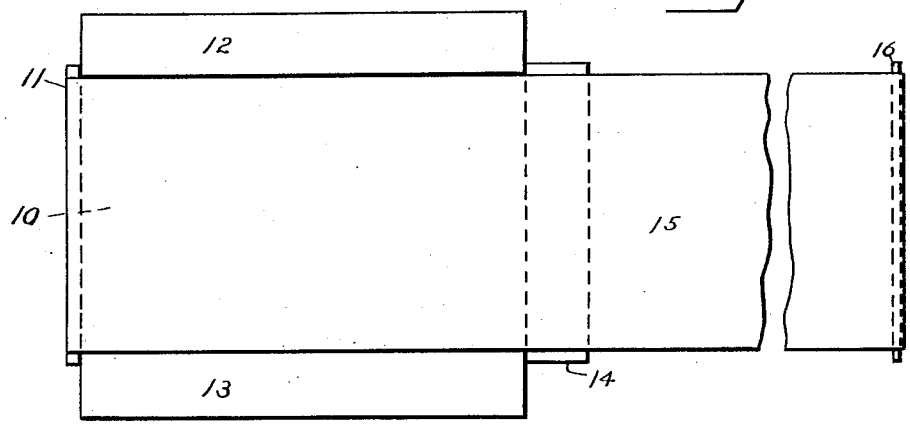
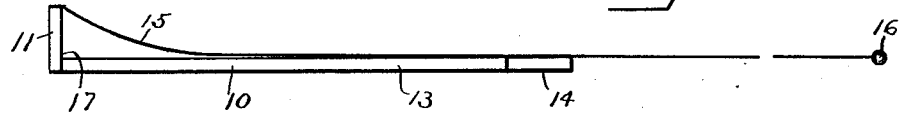
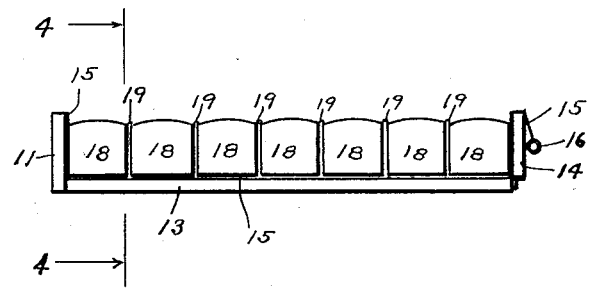
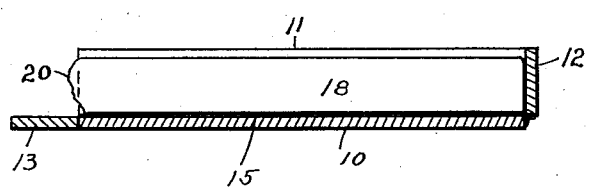
INVENTORS
Aaron Goldschlager,
Isidore Raze,
BY
Henrik J. Schmidt
ATTORNEY.

Patented Oct. 4, 1932

1,881,054

UNITED STATES PATENT OFFICE

AARON GOLDSCHLAGER AND ISIDORE RAZE, OF BROOKLYN, NEW YORK

BREAD MOLDING DEVICE

Application filed April 1, 1932. Serial No. 602,438.

The invention relates to molds for forming dough into loaves before baking them. A large demand exists for so-called "sandwich loaves". The custom of cafeterias and other restaurants in which these loaves are mainly used is to slice them on a machine, and it is expected that each loaf will yield a certain number of slices and that as little waste as possible, in the shape of end crusts, will be incurred in the slicing. For these reasons it is highly desirable that such loaves be made of exact lengths and with square ends. The present invention has for its main object to provide a device with which these results may be obtained. Another object is to provide a device of simple, strong and sanitary construction which can be manufactured at low cost.

These and various other objects and advantages will be readily understood from the following description and from the accompanying drawing of a preferred embodiment of the invention in which, however, certain modifications may be made without departing from the scope of the appended claims.

In the drawing

Fig. 1 is a plan view of the mold shown open and empty,

Fig. 2 is a side view of Fig. 1,

Fig. 3 a side view showing the mold filled with dough, and

Fig. 4 an end view taken on line 4—4 in Fig. 3.

Referring now to all the views, the device consists of a rectangular bottom plate 10, to which an end board 11 is rigidly secured, two side members 12 and 13, and an end member 14. The side and end members are hinged to the bottom board and the side members are preferably covered with canvas on their inner sides. A canvas strip 15 is secured to the upper edge of the end board 11. It is considerably longer than the mold and is provided with a bar 16 which functions as a handle member.

The device is used in the following manner: The canvas strip is tucked into the corner 17 and a weighed and roughly shaped quantity of dough 18 is placed on the canvas strip against the part of the strip which contacts with the end board 11. The canvas strip is lifted up on the other side of the dough and folded back so as to form a two-ply-partition 19 between the first piece of dough and the second piece to be inserted. This is repeated until the mold is full after which the end member 14 is closed. In closing this member all the pieces of dough are pressed and shaped properly. The ends 20 of the dough are squared by the closing of the side members 12 and 13. The hinged members are all provided with some suitable means for maintaining them in their closed position.

When the molded dough is to be removed, the hinged members are lowered and the canvas strip is pulled out of the mold, thus separating the loaves so that they may be easily handled.

From the foregoing it will be seen that the device is of simple construction and easy to operate, and that it will effectively perform its work.

Having described our invention and its operation, what we claim as new and wish to protect by Letters Patent is:

1. A bread mold comprising; a bottom plate; an end plate rigidly secured to the bottom plate; side plates hinged to the bottom plate; another end plate which is hinged to the bottom plate; and a fabric strip, of a length greater than that of the mold and a width substantially the same as the width of the mold, secured to the rigid end plate and adapted to be folded between the individual pieces of dough to be molded.

2. A bread mold comprising; a bottom plate; an end plate rigidly secured to the bottom plate; side plates hinged to the bottom plate; another end plate hinged to the bottom plate; and a fabric strip, longer than but of substantially the same width as the mold, secured at one end to the rigid end plate; and a handle member secured at the free end of the strip.

AARON GOLDSCHLAGER.
ISIDORE RAZE.